UNITED STATES PATENT OFFICE.

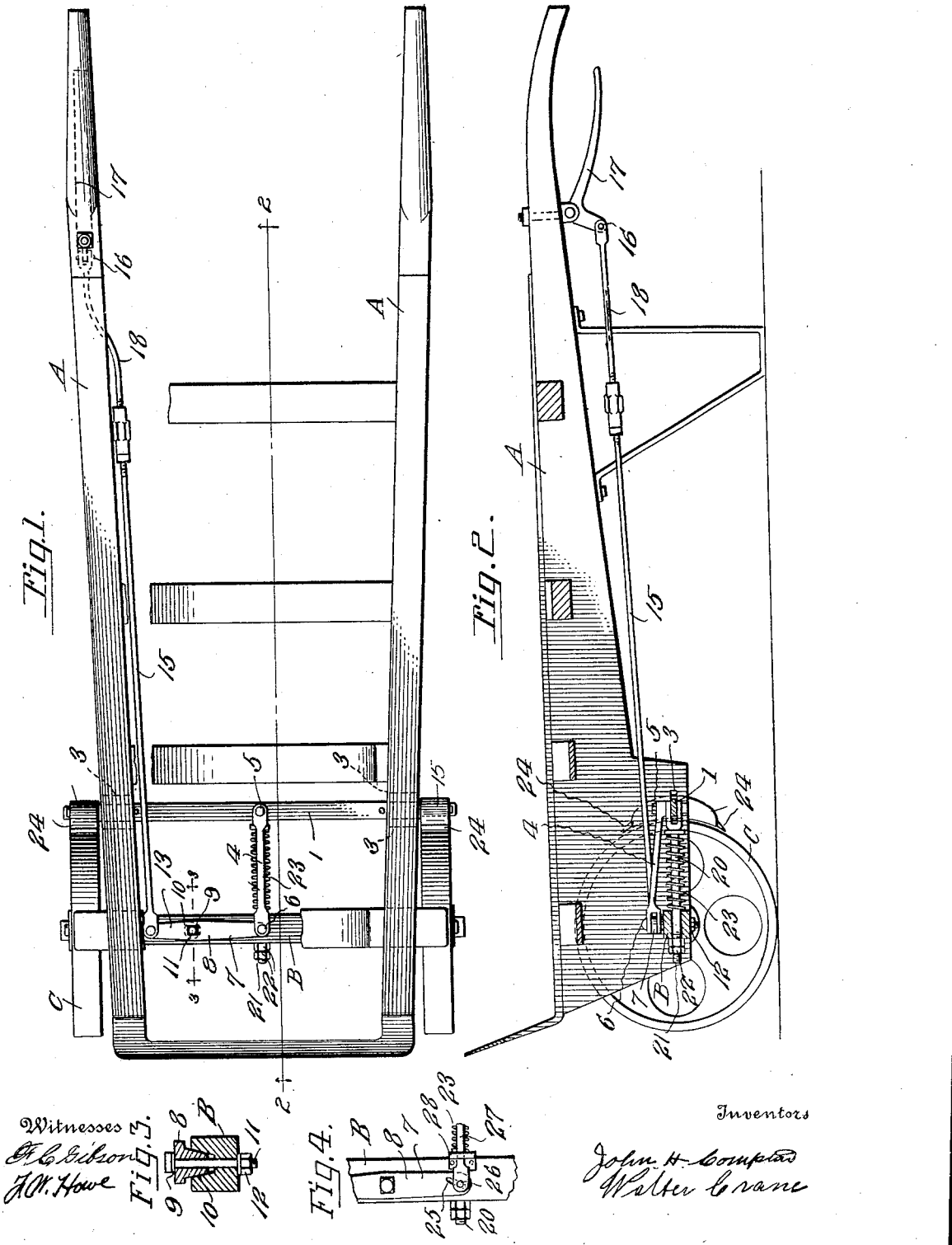

JOHN H. COMPTON AND WALTER CRANE, OF BALTIMORE, MARYLAND.

BRAKE FOR HAND-TRUCKS.

1,119,068.  Specification of Letters Patent.  Patented Dec. 1, 1914.

Application filed November 29, 1913. Serial No. 803,680.

*To all whom it may concern:*

Be it known that we, JOHN H. COMPTON and WALTER CRANE, citizens of the United States, residing at Baltimore city, in the State of Maryland, have invented certain new and useful Improvements in Brakes for Hand-Trucks, of which the following is a specification.

This invention relates to a brake and particularly to a brake of that class which may be applied to hand trucks now commonly used in loading and unloading freight from vessels and transporting the said freight stored on and about wharves to delivery wagons or warehouses.

One object of the invention is to provide means whereby any degree of pressure may be quickly and evenly applied simultaneously to both wheels of a heavily loaded truck when descending an inclined plane disposed between the wharf and the deck of a vessel, thereby preventing skidding of the truck.

A further object of the invention is to provide means whereby the pressure of the brake shoes upon the wheels of the truck may be quickly and easily increased or diminished at the will of the operator when there are several trucks ascending or descending the inclined plank disposed between the vessel's deck and wharf.

A further object of the invention is to provide means which normally hold the brake shoes free of engagement with the truck wheels and means which when actuated offsets the action of the first named means so that the wheels of the truck may be quickly and tightly clamped by the brake shoes.

A further object of the invention is to provide the brake shoes with a wheel scraping means through the action of which particles of rosin, tar and cotton lint accumulated by the wheels when goods of this character are transported by the truck may be removed.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing,—Figure 1 is a top plan view of a truck with parts broken away, showing the invention applied thereto. Fig. 2 is a vertical sectional view taken on the line 2—2 in Fig. 1. Fig. 3 is a vertical sectional view taken on the line 3—3 in Fig. 1. Fig. 4 is a fragmentary plan view of a modified form of the invention.

Corresponding parts in the several figures are denoted by like characters of reference.

The letter A designates the side rails of a truck; B, the axle, and C, the wheels thereof.

A horizontally and laterally disposed brake shoe carrying beam 1 is mounted in horizontally alined slots 3 in the side rails A of the truck, said beam being adapted to be slid horizontally in the slots 3 through the action of a horizontally and longitudinally disposed link 4 having one end thereof centrally pivoted to the said beam, as at 5. The other end of the lever 4 is pivotally connected, as at 6, to the long arm 7 of a horizontally and laterally disposed lever 8 pivoted, as at 9, to the truck axle B. To provide against lost motion due to wear of the lever 8 at the pivot point we provide the said lever on its underside with a cone-shaped boss 10 adapted to be inserted in a similar opening in the axle B and pivotally and adjustably held in place by a bolt 11 and a nut 12 carried by the bolt. The short arm 13 of the lever 8 has pivotally connected thereto a horizontally and longitudinally extending rod 15 having the opposite end thereof pivotally connected, as at 16, to a hand lever 17 movably secured to the underside of the truck handle. In order that the handle 17 may be within convenient reach of the operator, and the rod 15, as well as the handle, out of the way of articles placed upon and projecting below the side rails of the truck, the said rod 15 is provided with an offset portion 18. Centrally connected to the brake shoe carrying beam 1 and extending longitudinally and passing through an opening in the axle B is a guide rod 20 having one end thereof threaded, as at 21, for the reception of nuts 22 to adjust the tension of a spring 23 carried by said rod and interposed between the beam 1 and the axle B, said spring and rod serving to normally hold the brake shoes from engagement with the wheels of the truck. In adjusting the brake shoes with relation to the wheels by the action of the nuts 22 on the rod 20 against the tension of the spring 23 it is necessary that the rod 15 be provided with means, such as a turn buckle, and a locking nut disposed behind the same to adjust the relation of the lever 17 to the handle of the truck. In order that gummy and adhesive particles of material may not be collected upon the truck wheels in sufficient quantities to interfere with the brake shoes applying equal pressure to both wheels of the truck when actuated, the brake shoes are provided with wheel scraping means 24.

In Fig. 4 there has been shown a slightly modified form of the invention, wherein the long arm 7 of the lever 8 is provided with an arcuate slot 25, said slot engaging a pin 26 carried by one end of a lever 27, said lever having one end passing through an opening in a clip 28 secured to the axle B, and its other end centrally connected to the brake shoe carrying beam 1. Through the above named means, it is readily apparent that when the lever 8 is actuated, the rod 27 and the brake shoe carrying beam will be drawn horizontally toward the axle, thereby assuring an even pressure of the brake shoes upon the truck wheels.

From the foregoing description, it will be readily apparent that in the operation of rolling a heavily loaded truck down an inclined plane, pressure upon the handle 17 which is within convenient reach of the hand of the operator exerts a pull upon the rod 15, which, in turn, through the action of the lever 8 and link 4, draws the brake beam 1 and the rod 20 in a forward direction against the action of the spring 23, thereby applying pressure of the brake shoes and scrapers carried by the beam 1 equally to each wheel of the truck. It will be noted that the movement of the handle 17 necessary to diminish or increase the pressure of the brake shoes upon the wheels may be regulated through the turn buckle or by the nuts which increase or diminish the pressure of the spring 23 against the sliding beam 1.

Having thus described the invention what is claimed as new, is:—

The combination with the axle and side bars of a hand truck, of a brake therefor comprising a beam slidably mounted in said side bars, shoes carried by the opposite ends of said beam, a lever pivoted to said axle, a handle pivotally mounted on one of said side bars, a rod connecting one end of said lever to said handle, a link pivotally connecting said lever to the medial portion of said beam, a guide rod slidably mounted in said axle and connected to said beam so as to limit the travel of the beam to a forward and rearward direction, nuts having screw threaded engagement with the free end of the guide rod for varying the pressure between the brake shoes and wheels of the truck, and a spring encircling said guide rod for restoring the parts to normal position.

In testimony whereof we affix our signatures in presence of two witnesses.

JOHN H. COMPTON.
WALTER CRANE.

Witnesses:
FREDERICK SCHMIDT,
DANIEL W. O'ROURKE.

Copies of this patent may be obtained for five cents each, by addressing the "Commissioner of Patents, Washington, D. C."